Figure 1:
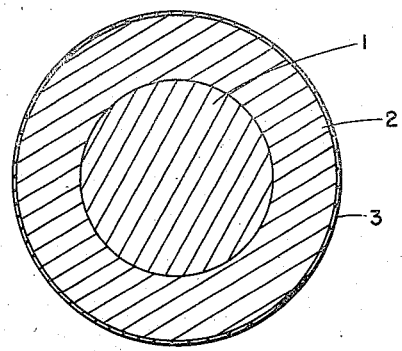

Sept. 23, 1958 W. E. ABBOTT ET AL 2,853,446
FUEL-BREEDER ELEMENT FOR A NUCLEAR REACTOR
Filed Aug. 6, 1956

INVENTORS
RALPH BALENT
WILLIAM E. ABBOTT
BY
William R. Lane
ATTORNEY

United States Patent Office 2,853,446
Patented Sept. 23, 1958

2,853,446

FUEL-BREEDER ELEMENT FOR A NUCLEAR REACTOR

William E. Abbott, East Pittsburgh, Pa., and Ralph Balent, Tarzana, Calif., assignors, by mesne assignments, to the United States of America as represented by the United States Atomic Energy Commission Application August 6, 1956, Serial No. 602,402

5 Claims. (Cl. 204—193.2)

Our invention relates to an improved nuclear reactor fuel element, and more particularly to an improved fuel-breeder fuel element.

For information concerning the theory, construction and operation of nuclear reactors, reference is made to Glasstone, "Principles of Nuclear Reactor Engineering" (D. Van Nostrand); "The Reactor Handbook" (3 volumes), available for sale from the Technical Information Service, Oak Ridge, Tennessee; U. S. Patents 2,708,656 and 2,714,577 to Fermi et al.; and to "The Proceedings of the International Conference on Peaceful Uses of Atomic Energy," August 8–20, 1955, Geneva, Switzerland, available for sale at the United Nations' Book Store, New York, New York.

Unless otherwise specified, conventional, accepted, nuclear terminology will be used herein. For example, "fissionable material" refers to thermal neutron fissionable plutonium, uranium-235 and uranium-233, and "fertile material" refers to thorium and uranium-238, which are capable of transmutation to fissionable species by neutron capture and beta decay. When uranium, thorium or plutonium is spoken of, this embraces both the metal and refractory oxides such as $ThO_2$ and $UO_2$.

In the development of economically competitive nuclear power, particular attention is being given to the conversion or breeding of new fissionable species. Since the supply of uranium is limited, widespread use of nuclear power requires the conversion of relatively abundant thorium to uranium-233 and of uranium-238 to plutonium. The resulting uranium-233 and plutonium can then be used for the further conversion of fertile material; thus, the potential exists for actually increasing the amount of fissionable material while, at the same time, extracting useful power. Furthermore, successful breeding, in providing a by-product of great value, significantly reduces the unit cost of generating nuclear power.

In the past, fertile material has been employed in many ways. Plutonium has been generally produced in natural uranium reactors such as the Hanford types. This requires subsequent costly chemical separation of plutonium from uranium. Thorium has been alloyed with uranium in fuel elements, employed as an aqueous thoria suspension, and as a thorium nitrate solution with the low cross-section nitrogen isotope. Difficulties have been associated with all these methods. Thorium-uranium alloys have to be subsequently separated by costly solvent extraction methods, the thoria suspensions tend to settle out and cause pumping problems, and the nitrate solutions require the expensive nitrogen-15 isotope. Further difficulties have been experienced with solid fuel elements used in breeder applications, such as high fabricational costs, limited burn-up, and low specific power due to uranium alpha-beta phase change at 1200° F. The uranium temperature in the center of the fuel rod has usually set the power level. To avoid the heat transfer problems created by this temperature limitation, and yet maintain a high flux, fuel elements comprising a cluster of relatively small diameter uranium rods have been designed. However, this only aggravates fabricational and decontamination costs.

Liquid fuels are known to possess a number of advantages over solid fuels, such as continuous and economical processing, unlimited burn-up, no fabricational or cladding costs, high specific power, annd reduced problems of radiation damage and heat transfer. Disadvantages are increased corrosion, increased fuel inventory in circulating fuel types, higher resonance capture, and problems connected with the circulation and containment of highly radioactive solutions.

An object of our invention, therefore, is to provide an improved fuel-breeder fuel element.

Another object is to provide a fuel-breeder fuel element, wherein the fertile and fissionable materials are separated and there is a minimum of cladding.

Anothesr object is to provide such a fuel element wherein the fuel is capable of high burn-up, ease of reprocessing, and is not subject to radiation damage or growth.

Still another object is to provide such a fuel element of improved heat transfer characteristics, wherein the power level is not limited by the central temperature of the fuel element.

A further object is to provide such a fuel element, wherein a single coolant may be used for both the fissionable and fertile material.

These and other objects of our invention will become apparent to those skilled in the art from the following detailed description, the attached claims, and the accompanying drawings. In the drawings, Figure 1 is a cross-section of our fuel element, and Figure 2 is a longitudinal section of a fuel element especially designed for a specific, known reactor.

In accordance with our present invention, we have provided an improved reactor fuel element comprising a container, and a solid fertile material and a non-aqueous fluid fuel composition disposed therein.

Our fuel element is notably distinct, for it permits fabricational and decontamination simplicity through separation of fissionable and fertile material and through minimum cladding. The liquid fuel in the fixed fuel system possesses advantages of both fixed fuel and liquid circulating fuels. With the liquid fuel, radiation damage, growth, phase change, heat transfer and decontamination problems are greatly reduced. Continuous bleed-off of small fractions of liquid fuel for partial decontamination in remakeup is possible. On the other hand, the disadvantages of the circulating liquid fuels are avoided. The solid fertile material may be separately withdrawn from the fuel element for recovery of the new fissionable species and replaced by fresh fertile material. Thus, problems previously associated with the chemical separation of fissionable and fertile material are avoided.

Figure 2:
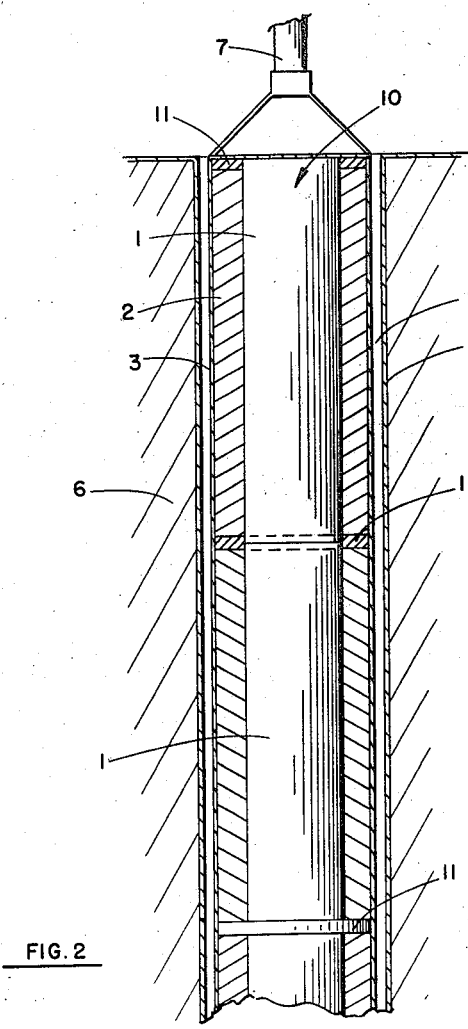

Referring now to the drawings, in Figure 1 fertile material 1, of thorium or uranium-238, occupies the central core of the element. Immediately surrounding this is the fluid fuel 2. The fuel composition is non-aqueous, and may comprise a solution or suspension of fissionable material in a molten inorganic medium, such as bismuth, bismuth-tin, or a fused, fluoride salt mixture of at least one alkali fluoride with uranium tri- or tetrafluoride. One representative fluoride mixture is $UF_4$—$LiF$—$NaF$—$KF$. Zirconium fluoride may also be used in the fluoride composition, one suitable mixture being $UF_4$—$ZrF_4$—$NaF$. Due to the relative low solubility of uranium in molten solvents, uranium is preferably highly enriched (at least 90%) with respect to uranium-235 or uranium-233. The fuel composition is in contact with container material 3, which may be of any metal of suitable nuclear and metallurgical properties, for instance, stainless steel or zirconium. With the fuel in the outer portion of the fuel rod, improved heat transfer is achieved, and the flux is no longer limited by the central temperature.

An example of our invention will now be given showing its particular adaptability to a known reactor. This reactor is the sodium-cooled, graphite moderated, thermal reactor, which is fully and completely described in a paper delivered by W. E. Parkins at the Geneva Conference on Peaceful Uses of Atomic Energy entitled "The Sodium Reactor Experiment" (SRE). This paper is available for sale at the United Nations' Book Store, New York, New York. Unless otherwise indicated, the assembly of our fuel rod in the coolant tube of the moderator can, and all other constructional details, is the same as indicated in the paper for the seven rod fuel cluster, with the exception that a single fuel rod replaces the seven rod fuel cluster in each fuel channel.

Figure 2 is a longitudinal cross-section of our cylindrical fuel element in a coolant channel of the SRE. Each coolant channel passes through the center of a hexagonal, zirconium-covered graphite moderator block and the fuel element fits in this channel. A column 10 of 12 separate, 6" long thorium rods, 1.5" in diameter occupies the center of the fuel element, each rod being supported by spacer washers 11 in contact with thimble 3. The thimble is of low carbon steel and is 15 mils thick. In the annulus between column 10 and thimble 3 is a solution 2 of uranium-bismuth containing between approximately 1.5–2 weight percent uranium 93% enriched in uranium-235 and having a radial thickness of 0.4875". A sodium coolant channel 4, 150 mils thick, is provided between the thimble and the zirconium cladding 5 (35 mils thick) of graphite moderator 6. The thimble is supported in the fuel channel by hanger rod assembly 7.

Table 1, below, shows the nuclear data for a number of different compositions of the assembly of Figure 2 for the SRE.

In the table the following conventional designations are used:

$p$—resonance escape probability
$f$—thermal utilization
$k$—infinite multiplication factor
$L$—diffusion length
$\tau$—Fermi age
$B^{2L}$—buckling
$Cr$—conversion ratio
$R_r$—reflector thickness, radial
$H_r$—reflector thickness, axial
$M(25)$—critical mass, kg. U-235

TABLE I

*Nuclear data*

| Case | Lattice Spacing, Inches | Fuel, gm./cc. | Wt. Percent U in Bi | Temp. of Bi, °F. | $p$ | $f$ | $k$ | $L^2$ | $\tau^1$ | $B^2 \times 10^4$ | $Cr_0$ | $R_r^2$(ft.) | $H_r^2$(ft.) | $M(25)$ | No. of Tubes | Power³ MW |
|---|---|---|---|---|---|---|---|---|---|---|---|---|---|---|---|---|
| IA | 11 | .1935 | 1.96 | 1,172 | .939 | .646 | 1.28 | 281 | 355 | 3.98 | .482 | 2.87 | 5.67 | 21.6 | 35.5 | 28.4 |
| IIA | | .1675 | 1.70 | 1,142 | | .613 | 1.22 | 304 | | 3.02 | .541 | 3.54 | 6.98 | 36 | 55.5 | 44.4 |
| IIIA | | .142 | 1.44 | 1,092 | | .5712 | 1.132 | 333 | | 1.82 | .628 | 5.19 | 9.94 | 90.8 | 106 | 85.0 |
| IB | 7.76 | .1935 | 1.96 | 1,172 | .882 | .661 | 1.23 | 194 | 362 | 3.78 | .600 | 2.99 | 5.89 | 49 | 78 | 62 |
| IIB | | .1675 | 1.70 | 1,142 | | .631 | 1.17 | 198 | | 2.91 | .663 | 3.69 | 7.17 | 78.2 | 118 | 94.5 |
| IIIB | | .142 | 1.44 | 1,092 | | .5917 | 1.101 | 205 | | 1.71 | .755 | 5.42 | 10.36 | 206 | 254 | 203 |
| IC | 5.65 | .1935 | 1.96 | 1,172 | .796 | .671 | 1.126 | 140 | 374 | 2.33 | .803 | 4.36 | 8.41 | 280 | 311 | 249 |
| IIC | | .1675 | 1.70 | 1,142 | | .638 | 1.07 | 154 | | 1.32 | .876 | 6.37 | 12.1 | 746 | 662 | 530 |

¹ No correction for inelastic scattering.
² Reflector savings of 60 cm. in radial direction and 50 cm. in axial directions.
³ Based on center rod power of 1000 kw. with radial peak to average of 1.25.

While the above example shows the particular suitability and adaptability of our invention for the SRE, it is understood that this is only by way of illustration and is not restrictive. Employing the fundamental features of our fluid fuel-solid fertile material fuel assembly, suitable modifications may be made for its use in reactors of other design. Therefore, our invention should be limited only as is indicated by the appended claims.

We claim:

1. An improved fuel-breeder type fuel element, which comprises a container of relatively low thermal neutron absorption cross-section, a central core of thorium, and an enriched uranium-bismuth solution disposed between said core and the walls of said container.

2. An improved fuel-breeder type fuel element, which comprises a cylindrical container of relatively low thermal neutron absorption cross-section, a central cylindrical core of thorium, and an enriched uranium-bismuth solution in the annulus between said core and said container.

3. A reactor fuel element comprising a container, a central core of a solid fertile material selected from the group consisting of fertile thorium and uranium-238, and a homogeneous distribution of fissionable material in a molten inorganic medium of relatively low thermal neutron absorption cross-section selected from the group consisting of fused fluoride salts, bismuth, and bismuth-tin disposed between said core and said container.

4. A reactor fuel element comprising a container of relatively low thermal neutrol absorption cross-section, a central core of a solid fertile material and a molten fuel composition comprising $UF_4$ and at least one alkali fluoride of relatively low thermal neutron absorption cross-section disposed between said core and said container.

5. A reactor fuel element comprising a container of relatively low thermal neutron absorption cross-section, a central core of fertile thorium and a molten fuel composition comprising $UF_4$, $ZrF_4$ and $NaF$ disposed between said core and said container.

No references cited.